United States Patent
Bonomi et al.

(10) Patent No.: US 10,972,579 B2
(45) Date of Patent: Apr. 6, 2021

(54) ADAPTIVE SCHEDULING FOR EDGE DEVICES AND NETWORKS

(71) Applicant: Nebbiolo Technologies, Inc., Milpitas, CA (US)

(72) Inventors: Flavio Bonomi, Palo Alto, CA (US); Chandra Shekhar Joshi, Saratoga, CA (US); Kannan Devarajan, Cupertino, CA (US); Pankaj Bhagra, Fremont, CA (US); Palani Chinnakannan, San Jose, CA (US)

(73) Assignee: Nebbiolo Technologies, Inc., Milpitas, CA (US)

( * ) Notice: Subject to any disclaimer, the term of this patent is extended or adjusted under 35 U.S.C. 154(b) by 208 days.

(21) Appl. No.: 15/783,998

(22) Filed: Oct. 13, 2017

(65) Prior Publication Data

US 2019/0116241 A1 Apr. 18, 2019

(51) Int. Cl.
*H04L 29/08* (2006.01)
*G06F 9/455* (2018.01)

(52) U.S. Cl.
CPC .......... *H04L 67/32* (2013.01); *G06F 9/45558* (2013.01); *H04L 67/325* (2013.01); *G06F 2009/45595* (2013.01)

(58) Field of Classification Search
CPC ... H04L 67/32; H04L 67/325; G06F 9/45558; G06F 2009/45595
See application file for complete search history.

(56) References Cited

U.S. PATENT DOCUMENTS

| | | | | |
|---|---|---|---|---|
| 8,190,084 | B1* | 5/2012 | Gunasekara | H04B 7/18582 455/12.1 |
| 10,044,524 | B1* | 8/2018 | Edelhaus | H04L 12/462 |
| 2007/0103476 | A1* | 5/2007 | Huang | G06T 15/005 345/522 |
| 2008/0240163 | A1* | 10/2008 | Ibrahim | H04J 3/0664 370/503 |
| 2012/0096205 | A1* | 4/2012 | Velayudhan | G06F 9/45558 710/260 |
| 2016/0224081 | A1* | 8/2016 | Worthington | G06F 1/206 |
| 2016/0308793 | A1* | 10/2016 | Levy-Abegnoli | H04L 45/16 |
| 2017/0187640 | A1* | 6/2017 | Vasudevan | H04L 47/50 |
| 2017/0222831 | A1* | 8/2017 | Zirkler | H04L 12/433 |
| 2018/0024537 | A1* | 1/2018 | Chauvet | G06F 11/3495 718/104 |
| 2018/0068134 | A1* | 3/2018 | Schwarz | G06F 21/71 |
| 2018/0124688 | A1* | 5/2018 | Thubert | H04L 1/18 |
| 2018/0237040 | A1* | 8/2018 | Mong | B61L 15/0081 |
| 2018/0302330 | A1* | 10/2018 | Bush | H04L 47/28 |
| 2018/0367594 | A1* | 12/2018 | Levy-Abegnoli | H04L 43/08 |
| 2018/0374188 | A1* | 12/2018 | Lv | G06T 1/20 |
| 2019/0079898 | A1* | 3/2019 | Xiong | G06F 9/5072 |

(Continued)

*Primary Examiner* — Hassan Kizou
*Assistant Examiner* — Abdullahi Ahmed
(74) *Attorney, Agent, or Firm* — Barry Choobin; Patent 360LLC

(57) ABSTRACT

Adaptive scheduling of compute functions in a fog network is described herein. An example method includes synchronizing kernel and hypervisor scheduling of applications used to control one or more edge devices using a global schedule, wherein the global schedule comprises timeslots for applications, and adapting the timeslots in real-time or near real-time based on application-based time related feedback that is indicative of time delays.

12 Claims, 10 Drawing Sheets

(56) References Cited

U.S. PATENT DOCUMENTS

| | | | |
|---|---|---|---|
| 2019/0109728 A1* | 4/2019 | Steiner | H04L 12/44 |
| 2019/0114247 A1* | 4/2019 | Chen | G06F 11/3409 |
| 2019/0297160 A1* | 9/2019 | Harriman | H04L 67/28 |
| 2019/0302221 A1* | 10/2019 | Sheng | H04W 4/02 |
| 2020/0145348 A1* | 5/2020 | Byers | G06F 16/119 |

* cited by examiner

US 10,972,579 B2

ADAPTIVE SCHEDULING FOR EDGE DEVICES AND NETWORKS

FIELD OF INVENTION

The present disclosure is directed to network management, and more specifically, but not by limitation to adaptive scheduling of edge devices and networks such as fog federation networks. Some embodiments allow for adaptive scheduling of a hierarchy of nested operating systems and applications on edge devices in a Time Synchronized Network (TSN) in order as to align a timeline schedule of application software on the edge devices with the arrival of the network packets destined to that application and guarantee processing of the packet with zero or minimized queuing delay.

SUMMARY

According to some embodiments, the present disclosure is directed to a fog federation system comprising at least one fogNode coupled over a network, wherein at least a portion of the at least one fogNode are coupled with one or more edge devices; and a system manager that: calculates and assigns schedules for one or more endpoints in the fog federation, the schedule comprising time slots during which one or more applications are executed by a kernel of the at least one fogNode in order to operate the one or more edge devices; and adjusts the schedules in real-time or near real-time based on feedback that is indicative of time related deviations relative to the schedules, so as to prevent communication drift within the system.

According to some embodiments, the present disclosure is directed to a method comprising: implementing a TSN schedule for managing a plurality of end points using a plurality of fogNodes, each of the plurality fogNodes comprising of a hierarchy of kernels of which at least one kernel of the plurality of the kernels implement a portion of the TSN schedule as directed by a system manager, receiving real-time or near real-time feedback from applications executing on the plurality of fogNodes, the feedback comprising information that is indicative of a time deviation relative to the TSN schedule, and selectively adjusting execution of one or more of the applications in order to compensate for the time deviation.

According to some embodiments, the present disclosure is directed to a method comprising: synchronizing kernel and hypervisor scheduling of applications used to control one or more edge devices using a global schedule, wherein the global schedule comprises timeslots for applications; and adapting the timeslots in real-time or near real-time based on application feedback that is indicative of time delays.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
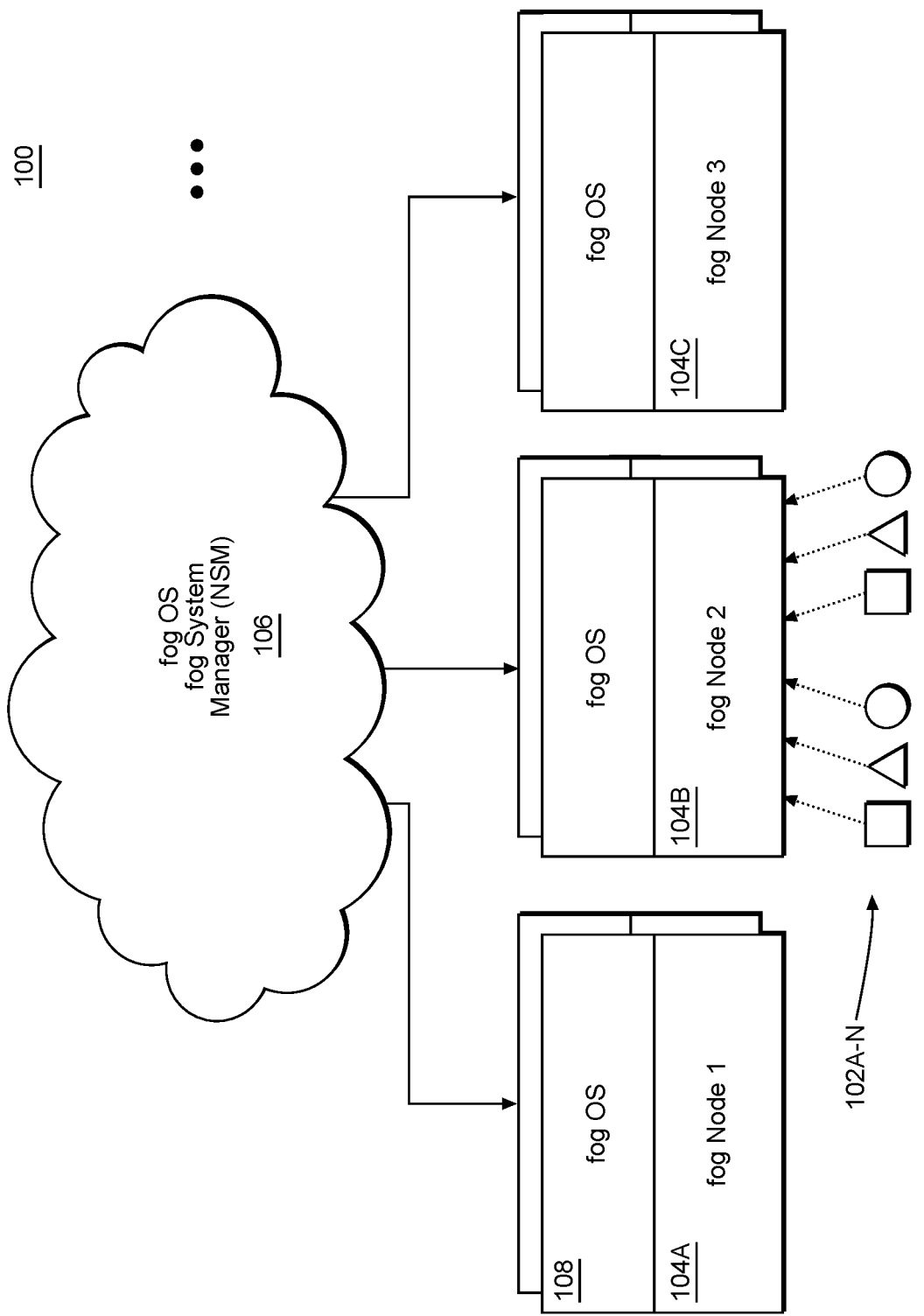
FIG. 1 is a schematic diagram of an example fog federation of the present disclosure, which implements adaptive scheduling disclosed herein.

Fog computing facilitates management of Industrial devices like robots, CNC (computer numeric controlled) machines, manufacturing machines, sensors, actuators, power management devices, air handlers, coolant circulating pumps and other devices, which are collectively called operational technology (OT) devices, are present in industrial floor, power plants, oil and gas rigs, high end data centers and other sectors. Many other OT devices exist and would be known to one of ordinary skill in the art.

A Fog federation also provides for a "local" distributed resource management and service orchestration on edge devices. This entails the availability of enough compute, storage, network, security resources closer to the data sources (machines, controls, etc.). This is especially attractive to an industrial floor like environment, wherein the producers and consumers of data are all co-located within a single roof.

The main constituent of a Fog Federation is a fogNode (FN), which dons multiple hats depending upon the deployment model. On one hand, an FN could be a network gateway or a lead FogNode for a deployment. On the other hand, it could participate in a distributed asset management and monitoring solution.

In some embodiments, a unique aspect of a Fog federation is the presence of an Ethernet Time Sensitive Network (TSN). According to some embodiments, a Fog could use any of the following options with regard to provisioning TSN end-points. In some embodiments, the Fog Federation can deploy a centralized control element, Lead Fog Node (LFN) with controller softer that generates TSN schedules, and provisions TSN elements with such schedules. In another embodiment, the LFN Controller can implement a hop-by-hop approach where participating TSN elements generate TSN schedules based on per-flow heuristics. In some embodiments, the LFN can implement both of the centralized and hop-by-hop approaches.

In some embodiments, the present disclosure is directed to network management, and more specifically, but not by limitation to adaptive scheduling of edge devices and networks such as fog federation networks. Some embodiments allow for adaptive scheduling of a hierarchy of nested operating systems and applications on edge devices in a Time Synchronized Network (TSN) in order as to align a schedule of application software on the edge devices with the arrival of the network packets destined to that application and guarantee processing of the packet with zero or minimized queuing delay.

For context, the Internet of Things (IoT) is primarily a network infrastructure that manages devices at the edge of the network (referred to as "edge devices"). A fogNode, noted above, is one element of the IoT network infrastructure that is deployed at an edge of a network (e.g., fog federation) and manages multitudes of active/passive devices at its edge. Many of these devices at the edge are mission critical and play an important part in the continual functioning of a domain system (also known as the IoT vertical) at the edge. A domain will be understood to include a device type or collection of devices that perform a function. For example, a domain could include welding machines, robots, which identify device types or could include a function, such as welding (e.g., a function).

In such domains, it is imperative that the data generated by these devices are processed in hard real-time and associated actions are performed. For example, in the manufacturing industry, robots are deployed as edge devices and they generate data indicating critical situations like imminent failures, collisions, and so forth, which must be handled quickly. Failure to do so would result in deleterious effects such as loss of productivity, damage to expensive equipment, and sometime even loss of human life. Similar situations exist in other IoT verticals, which leads to the establishment of a fundamental requirement of IoT that data generated by an edge device is processed and acted upon in real-time or near real-time. The aspect of "real-time" is flexible and is defined by process control attributes of an associated domain. The real time measured in terms of wall clock time ranges from 100s of microseconds to 10s of seconds (but could alternatively be more or less).

Hard real time processing requires that data produced by edge devices are processed deterministically using technology, such as Time Synchronized Networking (TSN), that establishes strict bounds on data (e.g., data packet) processing parameters like data propagation delays, processing delays, queuing delays, and jitter—just to name a few. With such bounds and resulting determinism set forth, data processing systems of the present disclosure are designed to be ready to react to real time events in a manner appropriate to the operating domain. These relative time constraints and what constitutes appropriateness for any given domain can be defined by system administrators, and corresponds or relates to the edge devices. For example, edge devices that, if allowed to operate errantly, will result in significant deleterious effects such as physical damage to the edge device or an operator, may have time constraints that are much more confining (e.g., shorter response times) than devices that if allowed operate errantly would not cause immediate harm.

Time Synchronized Networking, TSN, is Ethernet based Layer 2 networking in which network elements, network resources, and network entities are time synchronized and operate according to a schedule that is computed globally within the TSN network. Time synchronization is achieved using IEEE 1588 standards that provides for sub-microsecond levels of time synchronization.

The global schedule defines the operational parameters of devices within the network such as nodes including VMs, switches, end points, and so forth. That is, the global schedule includes schedules for each individual component in the network. The global schedule comprises time slots, with each device, service, application, and so forth being assigned a particular time slot during which operations may be executed. Some parts of the network operate at the same time. For example, an edge device may share a time slot with a switch and VM, allowing the edge device to send monitoring or operational data to the VM through the switch at scheduled intervals of time. These are merely examples and one of skill in the art will appreciate the operation of a TSN and its corresponding scheduling.

The global schedule and the imposition of a time slot on each network element (switch) interface ensure packet transmission and reception is performed with minimal congestion. Like regular Ethernet network, TSN network also provides priorities and flow classification into real time and best effort operations.

TSN Networking is a fundamental networking technology used in IoT. Aspects of TSN can be integrated into the Fog network and foNodes of the present disclosure to meet hard real time requirements described above. Prior to TSN networking a myriad of other networking technologies like EtherCAT, were deployed each with its own mechanisms and variations, however, leading to difficulties in interoperability. TSN networking brings the much-needed interoperability in different IoT verticals and in addition, brings a different set of problems to be solved. One such problem is the need for schedule synchronization from networking into the compute world of the Fog network. The global schedule of the TSN networking is extended into compute systems in order to ensure the executing of hard real time requirements and to act upon real time events in a timely manner. These real-time events resulting from hardware effects can cause computing drift and other effects that result in application execution delays and other drawbacks. For example, hardware issues in the underlying Fog network can cause data transmission delays that in turn result in late execution of applications who are assigned to hard real-time time slots in the global schedule. These errors can multiple and/or propagate causing a compounding effect. For example, a slight delay in motor operation can result in a welding arm of a robot failing to move in time, which in turn causes the welding arm to weld an incorrect part of a workpiece.

The systems and methods disclosed herein remedy these deficiencies by extending time synchronization and TSN networking at the edge of the fogNode into a compute domain of the fogNode to synchronize kernel and hypervisor scheduling of application(s) that process the critical edge device data. Some embodiments comprise the ability of the systems and methods to implement a deterministic pinned scheduling concept that requires a scheduler to schedule one or more application(s) precisely at the required timeslot specified in a global time schedule. The requestor of such a scheduling is the application itself that determines the required timeslot through an adaptive behavior. The adaptive behavior compensates for drifts and delays of events that are inherent in any system introduced due to quantum effects, which are noticeable and/or pronounced at submillisecond times.

FIG. 1 is a schematic diagram of an example fog federation 100 that is configured and constructed in accordance with the present disclosure. The federation 100 implements the adaptive scheduling features described herein, where compute functions of applications executed within the network can be dynamically scheduled to account for time discrepancies that may occur within the network.

An IoT network, comprises of several types of edge devices 102A-N, such as robots, numerical control machines, actuators, sensors, vehicular devices, and so forth.

The edge devices are managed by an edge device management system comprising a collection of fogNodes, such as fogNodes 104A-C and a cloud hosted management element called the system manager or fogSM 106.

In general, a fogNode is a small chassis computing device (such as a server blade) equipped with one or more compute cards called fogLets and one more auxiliary cards for specialized functions like I/O or storage. A fogLet comprises an integrated compute module, one or more optional vector processing units (GPU), a set of solid state storage devices, and a collection of I/O controllers used to control a rich set of I/O interfaces. One of the I/O interfaces is a TSN based Ethernet endpoint which is connected to an internal TSN switch in the fogLet. The fogLet's I/O interfaces are used for connecting edge devices like sensors, actuators, machines, robotic systems, and so forth. The fogLet host's a modular operating system called the fOS, with an integrated hypervisor capable of hosting hard real time software/applications.

In some embodiments, the fogNodes 104A-C are interconnected into a network and managed by an instance of the fogSM 108 executing a federation application/logic. Fog federation deployment is an example method used for edge device connectivity and service restoration when a directly connected fogNode that services the edge device, fails. In one or more embodiments, the federation 100 is a deployment of a collection of fogNodes to manage edge devices. The fogSM 108 comprises that is controller software hosted in a cloud or on a stand-alone server that manages the deployment and operation of the federation 100 and the associated fogNodes, fogLets, edge devices, and combinations thereof.

Figure 2:
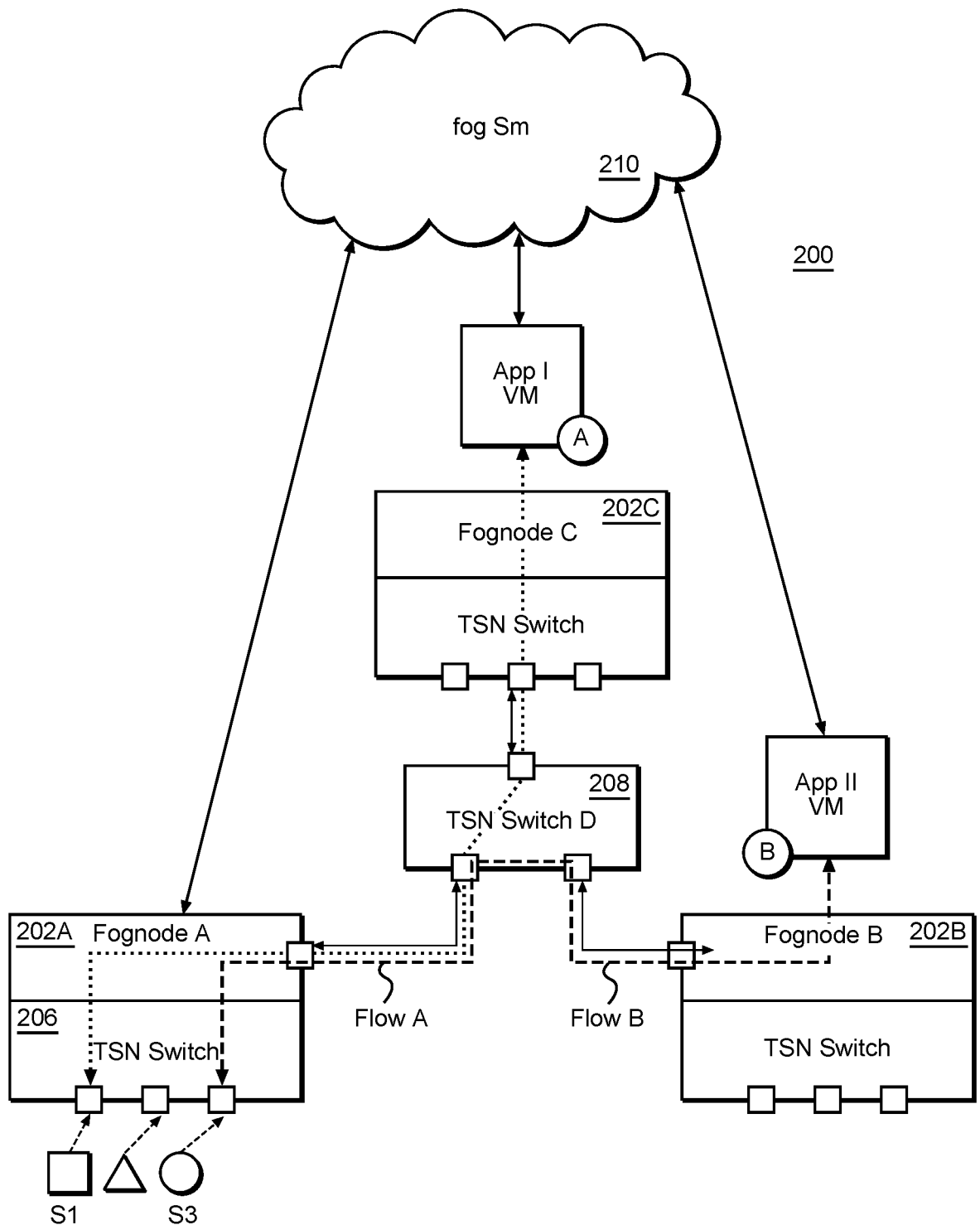
FIG. 2 is a schematic diagram of another example fog federation constructed in accordance with the present disclosure.

In various embodiments, federation 100 (e.g., network) may be a TSN network in certain deployments, such as in IoT deployments that require hard real-time management of edge devices (e.g., assets). FIG. 2 illustrates a TSN network in fog federation. The example fog federation 200 comprises fogNodes 202A-C interconnected by a TSN network. In some embodiments, the TSN network includes internal and external TSN switches that allows for intercommunication between fogNodes 202A-C and respective edge devices 204A-N. Additional or fewer fogNodes can be deployed as needed, per IoT system demands.

In some embodiments, the fogNodes 202A-C are each equipped with an internal TSN switch, such as internal TSN switch 206. The fogNodes 202A-C are interconnected/capable of interconnection with an external TSN Switch 208. The fogNode 202A is equipped with Edge Device S1, and S3 that are TSN Endpoints and generate real time data that is managed by applications hosted on fogNode 202B and fogNode 202C, respectively. A management application on a fogSM 210 calculates global TSN schedules for all the elements in real-time data flows, such as flow A and flow B, where flow A comprises a path between S1-fogNode 202A-TSN switch 208-fogNode 202C (internal switch)-fogNode 202C NIC-Hypervisor of fogNode 202C (see FIG. 1)-Application I VM-Application I; and flow B: S3-fogNode 202A-TSN switch 208-Fognode B (internal switch)-fogNode 202B NIC-Hypervisor B-Application II VM-Application II.

Figure 3:
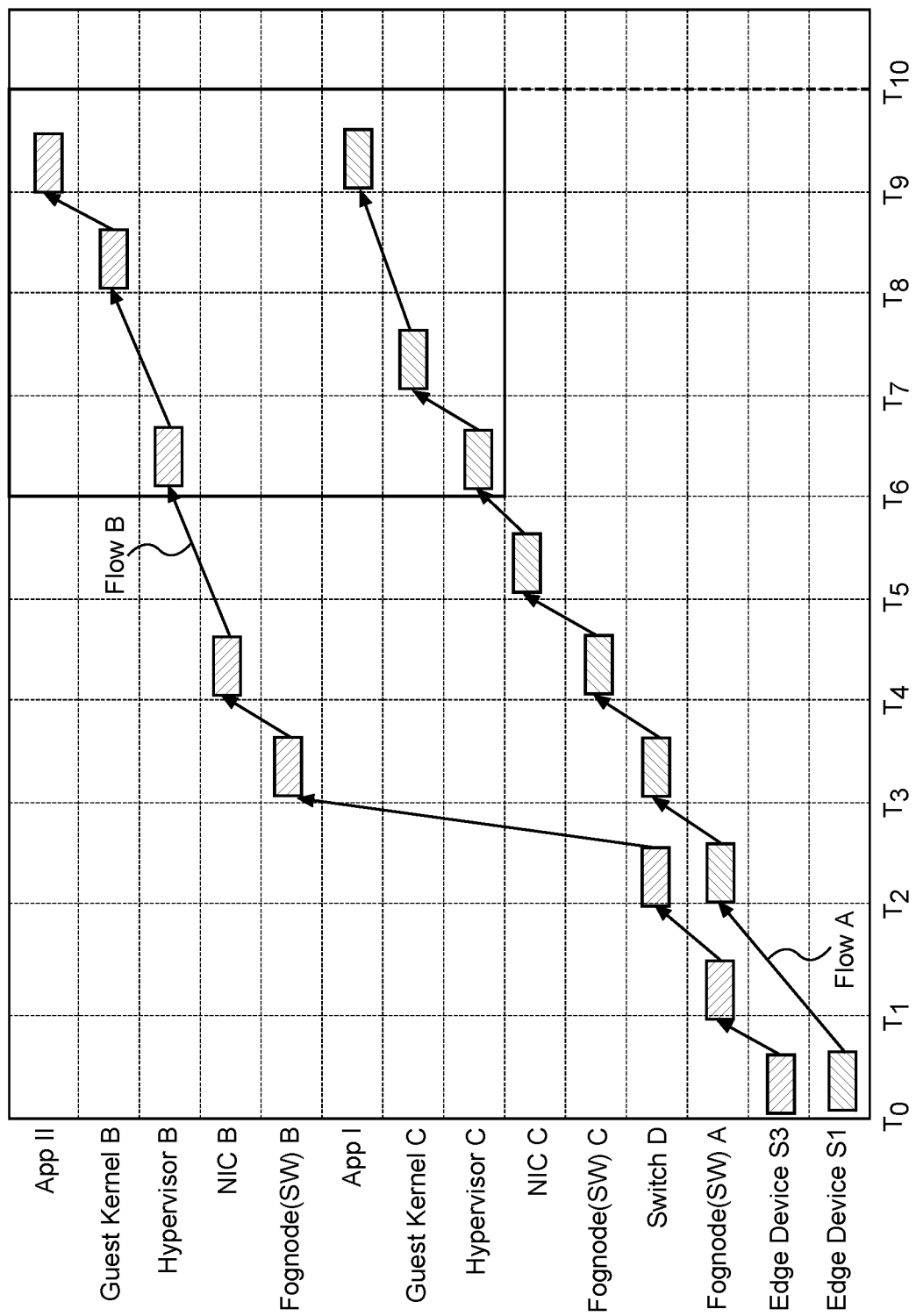
FIG. 3 is a graphical representation of TSN flows A and B occurring in the fog federation of FIG. 2.

FIG. 3 is a graphical representation of the flows A and B described above. FIG. 3 illustrates a schedule for flow A and flow B in the network of FIG. 2. The schedules are calculated by fogSM and assigned as shown to each network element/function/application in the flow. This schedule calculation is performed across TSN flows in the federation and the resulting schedules programmed into network element components. Schedules for the components such as the hypervisor, guest kernel and the application(s), are pre-provisioned and are illustrated as a rectangular box and are illustrative only as imposing the schedule on the software components. Advantageously, a solution of the present disclosure involves the imposition of a time schedule on software component and also enablement/execution of the software components in a deterministic manner. The solution also can involve adaptations to scheduling discrepancies in order to converge on a specified schedule.

Figure 4:
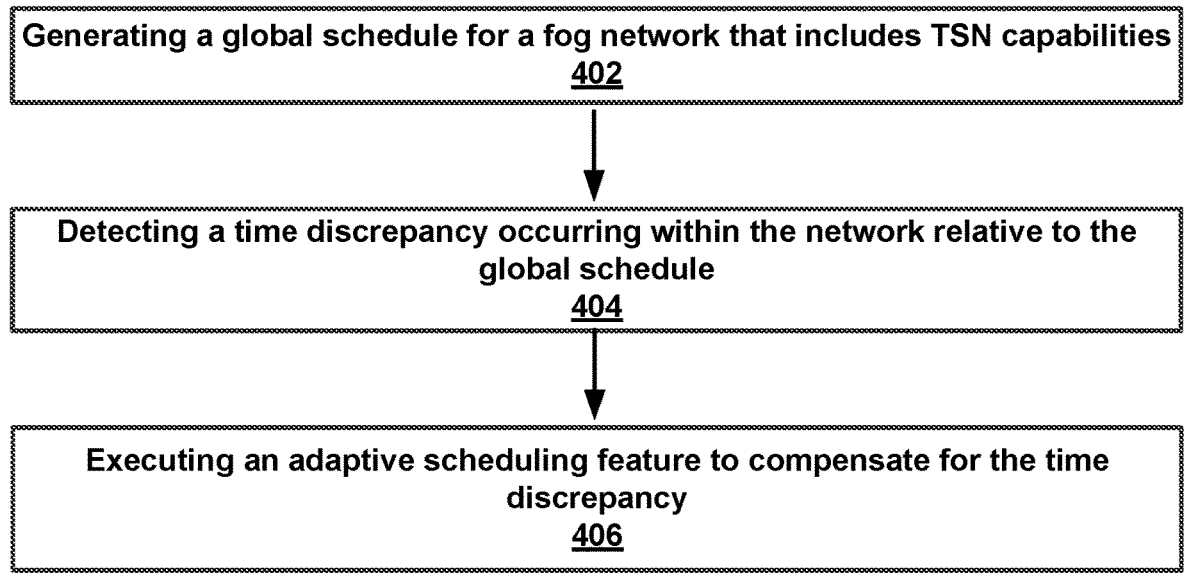
FIG. 4 is flow diagram of an example method for adaptive scheduling.

FIG. 4 is flow diagram of an example method for adaptive scheduling. In some embodiments, the method includes a step 402 of generating a global schedule for a fog network that includes TSN capabilities. The global schedule defines how data can flow through the network (intercommunication) between fogNodes and/or edge devices. This can occur within a fogLet in some embodiments.

During operations on the network, time discrepancies can occur relative to applications executing in the fogNodes. For example, it will be understood that an edge device utilizes an application on a fogNode. The application executes within a time slot in a global schedule that extends from T6-T10, where the time slot prior from T0-T5 is set aside for kernel to prepare to execute the application. Also, during time slot T0-T5, the kernel waits for operational or status data from the edge device. Due to late receipt of operational data by the kernel of the fogNode caused by some type of network or device entropy. This is an example of a time discrepancy. In general, a time discrepancy is any time delay that is induced that affects the global schedule.

But for the adaptive scheduling of the system (described in greater detail below), the time slot for execution of the application would be shifted from T6-T10 to compensate for the time discrepancy. By way of example, if the time discrepancy or delta is two, the time slot for execution of the application would drift or shift from T6-T10 to T8-T12. If not accommodated for, this drift/shift is perpetuated through a remainder of the global schedule, which could result in deleterious effects to the edge devices and/or the IoT system as a whole.

Thus, the method includes a step 404 of detecting a time discrepancy occurring within the network relative to the global schedule. In some embodiments, the time discrepancy could be determined from the application executing on the fogNode. For example, if the application executing it should be executing during time slot T6-T10, and the application determines that it has been delayed by starting at T8, it may transmit this delta to the guest kernel in the fogNode. The fogNode can forward the delta to a hypervisor of the fogNode. The hypervisor can then execute an adaptive scheduling feature to compensate for the time discrepancy. Thus, the method includes a step 406 of executing an adaptive scheduling feature to compensate for the time discrepancy.

Figure 5:
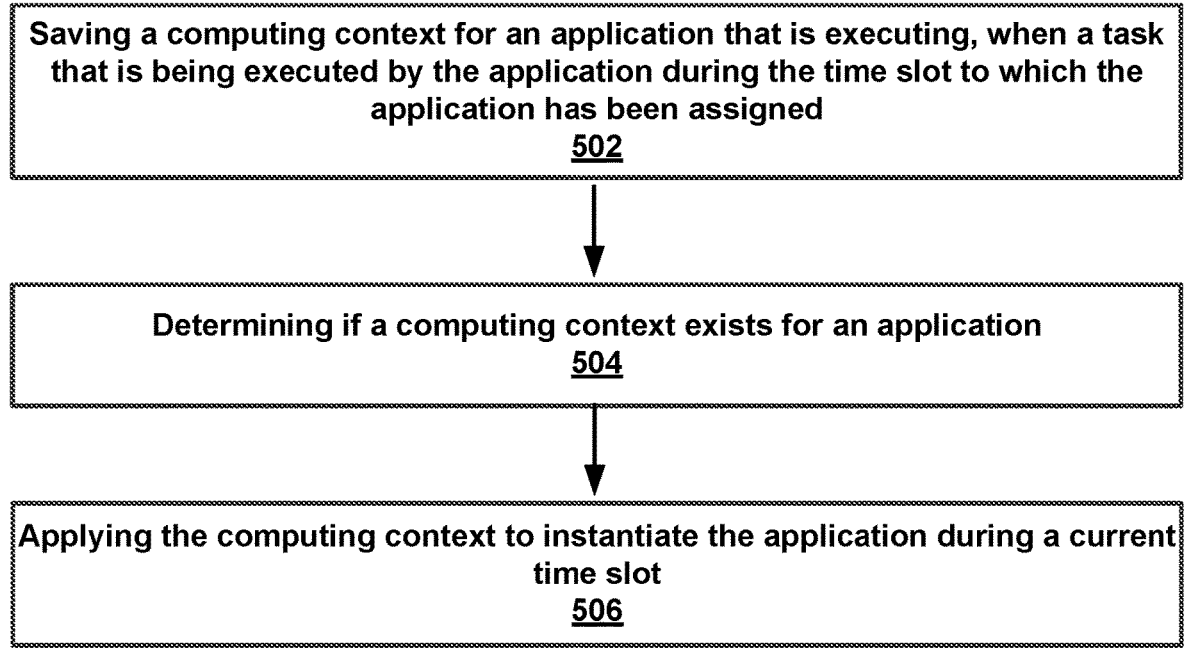
FIG. 5 is flow diagram of another example method for adaptive scheduling.

FIG. 5 illustrates an example method of adaptive scheduling. The method can occur in response to the detection of a time discrepancy occurring within the network relative to the global schedule. The method includes a step 502 of saving a computing context for an application that is executing, when a task that is being executed by the application during the time slot to which the application has been assigned. In the example discussed with respect to FIG. 4, time discrepancy of two exists. Rather than pushing the time slot for the application of T6-T10 to T8-T12, the kernel will obtain a computing context for the application. The computing context can include, for example, computing parameters for the application, such as resources including CPU, storage, network, security, I/O, and so forth. The kernel obtains a snapshot of these computing parameters and stores these computing parameters as the computing context. Rather than allowing execution of the application to extend past the original time slot of T6-T10, the kernel informs the application to terminate at T10. In order to complete the computing task, the application will be re-instantiated at its next future time slot in the global schedule. For example, the application is scheduled to run every 30 seconds. Rather than executing the application de novo, the kernel will execute the application and its stored computing context, allowing for rapid execution and processing. The application can finish the previously assigned computing task.

The method can include a step 504 of determining if a computing context exists for an application. If so, the method includes a step 506 of applying the computing context to instantiate the application during a current time slot.

Figure 6:
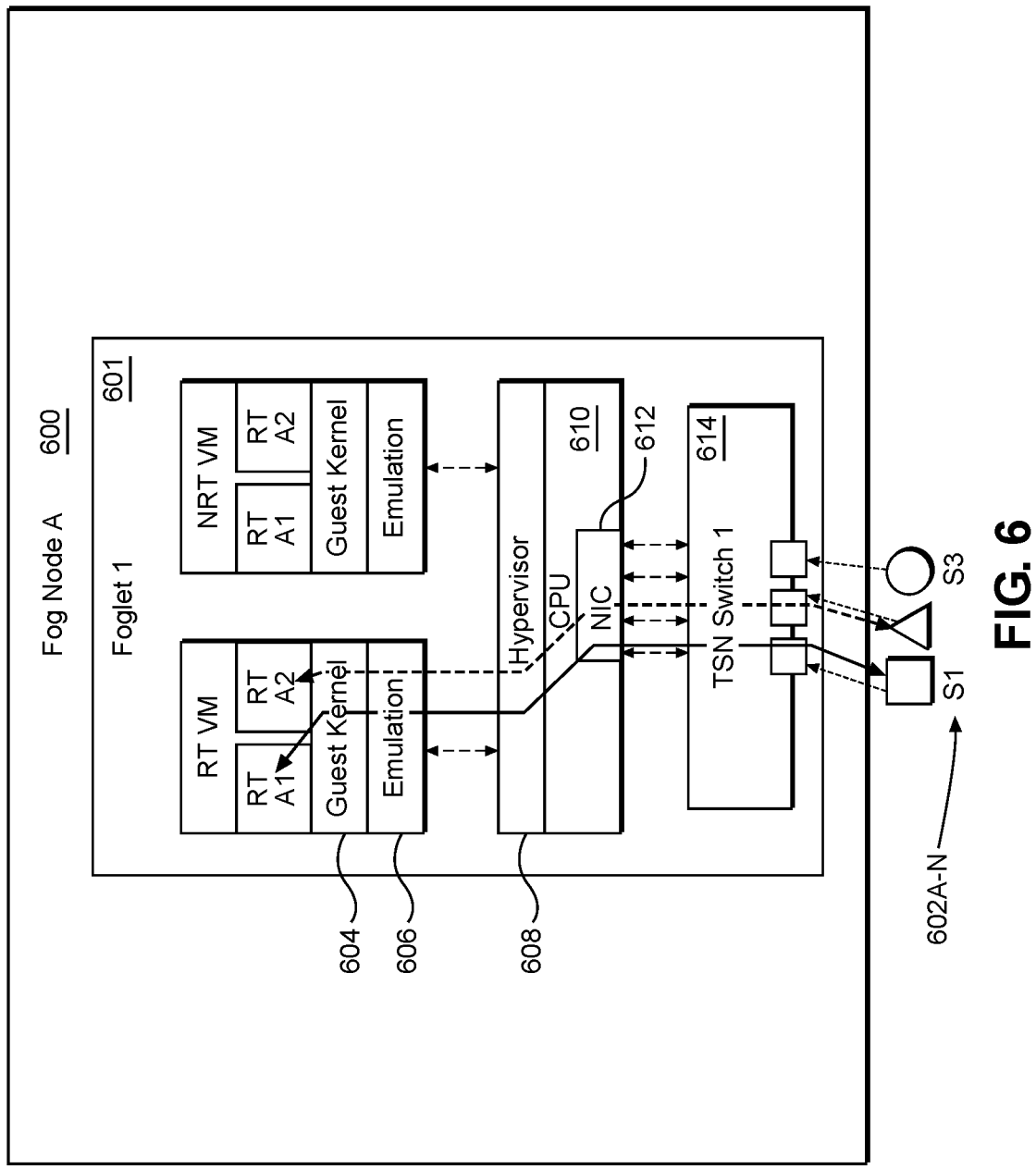
FIG. 6 is a schematic diagram of an example fog federation of the present disclosure, which implements adaptive, multilevel scheduling of compute functions (e.g., application execution).

In some embodiments, the present disclosure can implement multilevel scheduling in accordance with the present disclosure. FIG. 6 illustrates an example fogNode 600 that can be utilized in place of any of the fogNodes described above. The fogNode 600 comprises a foglet 601. The fogLet 601 comprises two virtual machines RT VM, which is a real-time virtual machine, and a NRT VM, which is a non-real-time virtual machine. The RT VM implements two or more applications RT A1 and RT A2 that are used to manage or control operations of functionalities of various edge devices 602A-N.

The RT VM implements a guest kernel 604 and emulation functionality 606. A hypervisor 608 coordinates and manages resources dedicated for use with the RT VM, such as processing CPU 610 resources and network interface card (NIC) 612 that comprises a plurality of network interfaces. As noted above, the fogLet 601 can comprise an integrated compute module, one or more optional vector processing units (GPU), a set of solid state storage devices, and a collection of I/O controllers used to control a rich set of I/O interfaces. One of the I/O interfaces is a TSN based Ethernet endpoint which is connected to an internal TSN switch 614. The internal TSN switch 614 allows the fogLet 601 to communicatively couple with the edge devices 602A-N.

Various data flows, such as flows A and B are illustrated in FIG. 6. A TSN flow on a single Foglet is illustrated in FIG. 6 and depicts components involved in the TSN flow. Hardware components that support the TSN schedule are the edge devices 602A-N, internal TSN switch 614 and the NIC 612. Virtualized components involved are the hypervisor 608, kernel 604 and the application(s) RT A1 and RT A2. The hypervisor 608 is a first level scheduler who schedules the kernel 604. The guest kernel 604 is a second level scheduler (lower in a hierarchical sense), which in turn schedules the applications RT A1/RT A2 that manages one or more of the edge devices 602A-N. In co-operative multitasking systems, like the ones described herein, application scheduling is not deterministic to pin an application schedule to a certain precise time slot. Adaptive scheduling of compute features and application execution are utilize instead.

Again, this could happen due to many reasons, however, an example reason is the kernel that schedules the applications (the guest kernel or the end application) is executing in a critical section and cannot complete the scheduling task in time. This issue is further aggravated due to the multi-level scheduling introduced by the hypervisor.

A common and current solution is to use programmable logic controller (PLC) devices, co-operative multi-tasking operating systems, and other single application operating environments to achieve determinism and serviceability of an edge device at precise times. However, the IoT vision aims consolidation of devices, integration of data between applications that are intra or inter verticals, and real time edge analytics, which require a preemptive multitasking system with virtual machines and hypervisor support.

Figure 7:
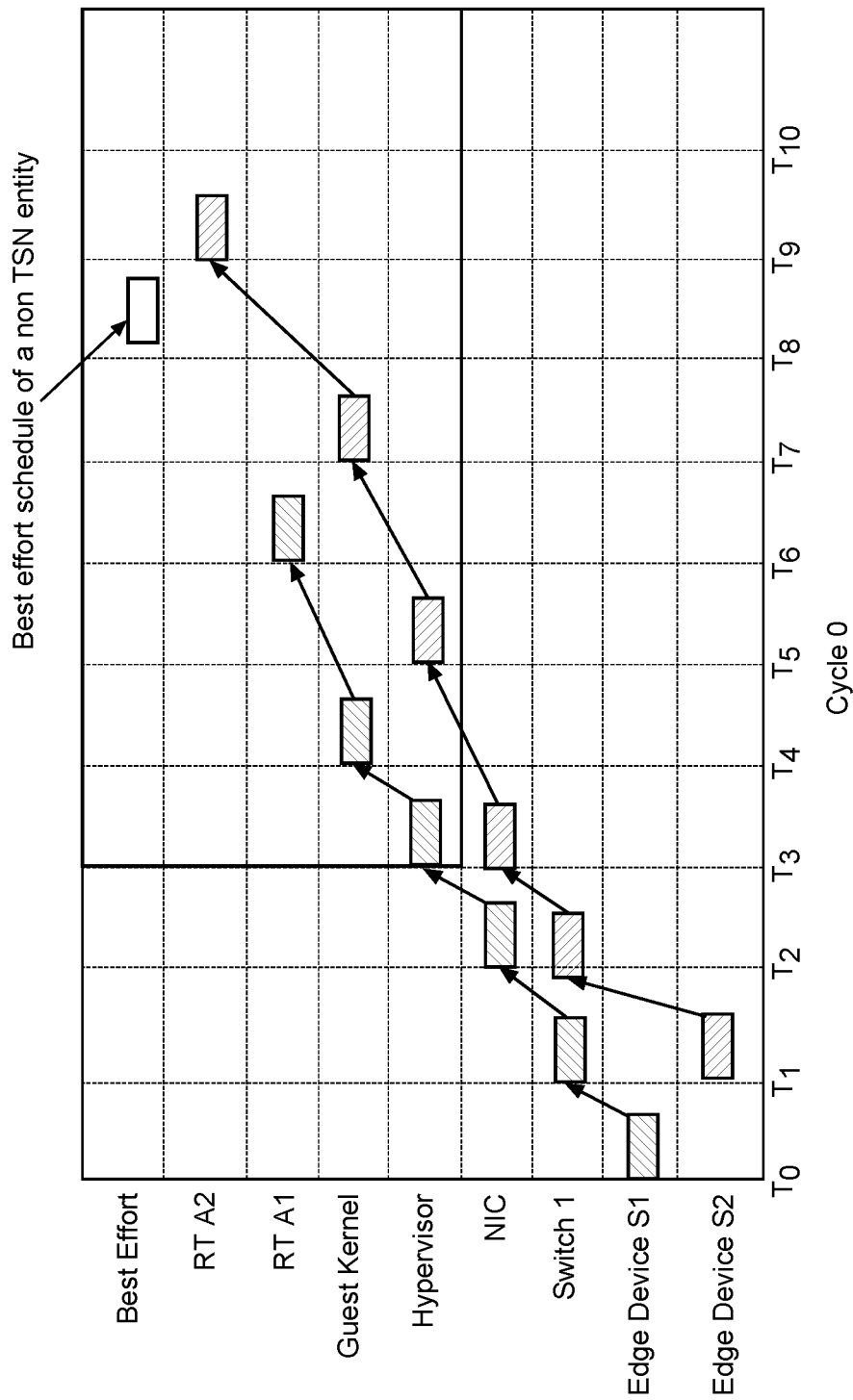
FIG. 7 is a graphic illustration of a global schedule for two flows A and B present in the system of FIG. 6

An example of adaptive scheduling using the system of FIG. 6 is illustrated graphically in FIG. 7. FIG. 7 is a graphic illustration of a global schedule for two flows A and B present in the system of FIG. 6. Salient aspects of this schedule include, but are not limited to edge device S1 transmitting its data in the global schedule T0, which is processed in the switch at the schedule T1 and in the NIC at T2. This processing in the hardware is deterministic, however, not deterministic once the packet enters into the hypervisor. The edge device S2 transmits its data in the global schedule T1, which gets processed by the switch and other devices as shown.

In both examples, the packet processing may occur anywhere in the open rectangular box show in the figure during adverse conditions, however, normal processing may occur as shown. In other words, there is no determinism on when the packet will get executed as well as when the cycle will close.

Consider the RT A1 that is processing the packets from edge device device S1. RT A1 can determine a current cycle it is executing (current time slot operation) using the global schedule (e.g., T6). RT A1 can also be configured with the exact desired schedule in which it must execute, which in this example would be T3, rather than T6.

The application RT App1 can compute on a cycle by cycle basis the offset incurred in the schedule (i.e, T6-T3). This is referred to herein as a time delta or time discrepancy.

The RT App A1 calls guest kernel services that support adaptive scheduling and requests a schedule shift of T6-T3. The guest kernel performs a similar computation for its own scheduling by the hypervisor and requests a shift by T4-T3. The hypervisor supporting adaptive scheduling can use hardware based VTx (virtualization technology) services to accurately schedule the RT A1 always on T3 and use VTx-d to schedule data packet(s) to the RT A1. In other words, the RT A1 is scheduled deterministically, but based on dynamic time related feedback.

Figure 8:
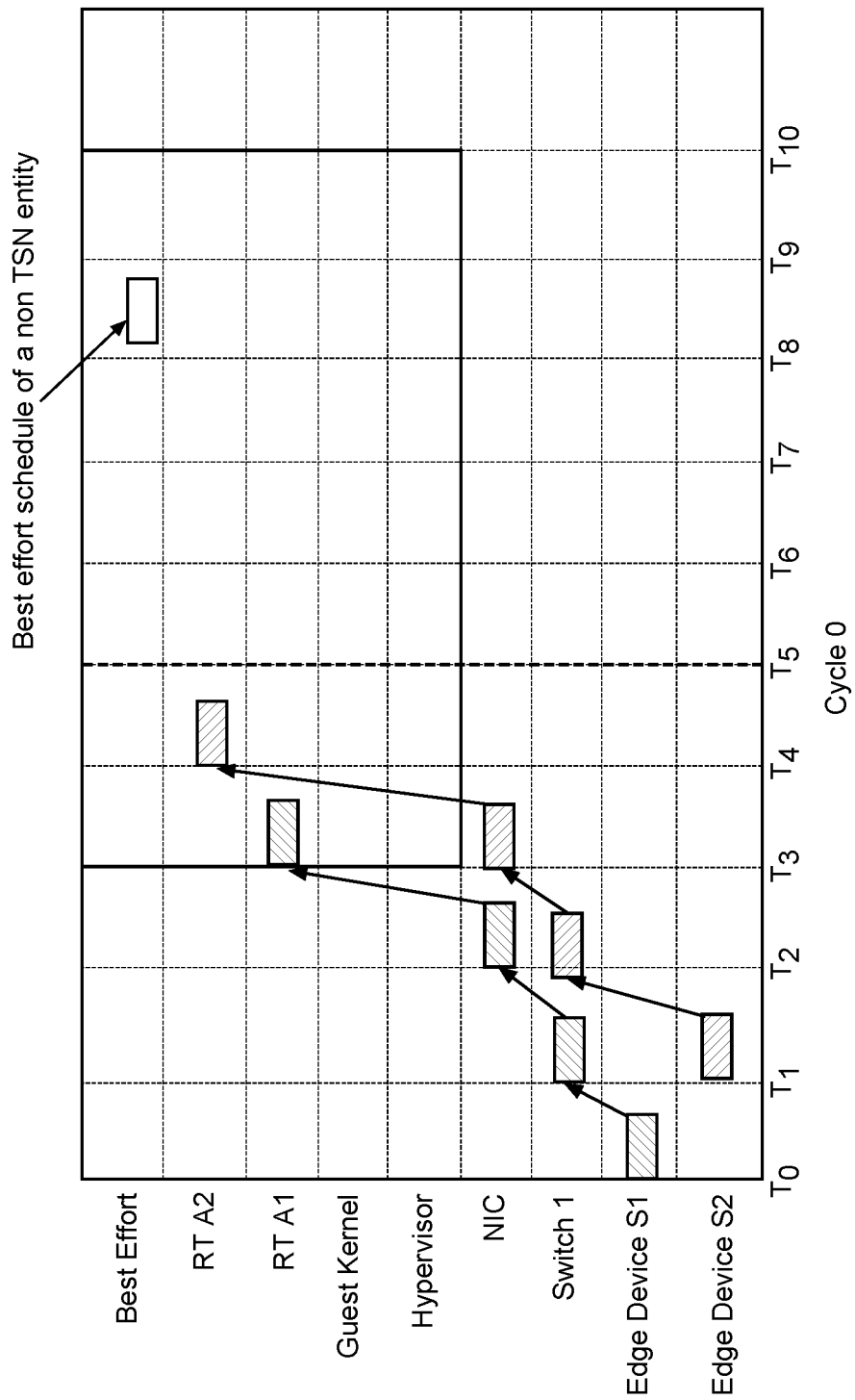
FIG. 8 is a graphical representation of hardware based adaptive scheduling according to the present disclosure.
Figure 9:
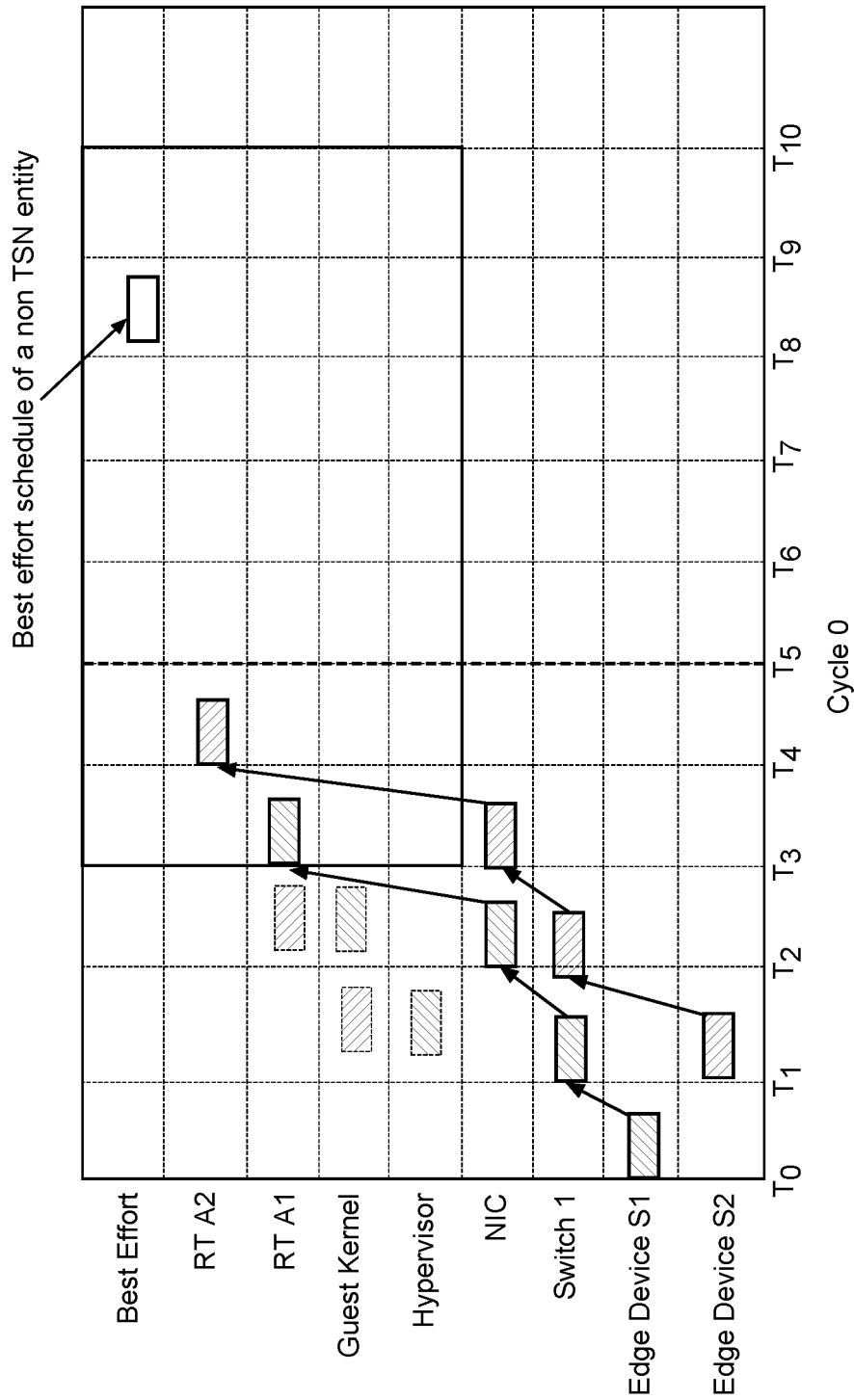
FIG. 9 is a graphical representation of hardware based adaptive scheduling according to the present disclosure.

FIGS. 8 and 9 collectively illustrate graphical representations of scheduling according to the present disclosure, where best effort scheduling of a non-TSN entity occurs. In general, deterministic scheduling of flows using hardware based services are illustrated in FIG. 8, and software based scheduling is illustrated in FIG. 9.

Figure 10:
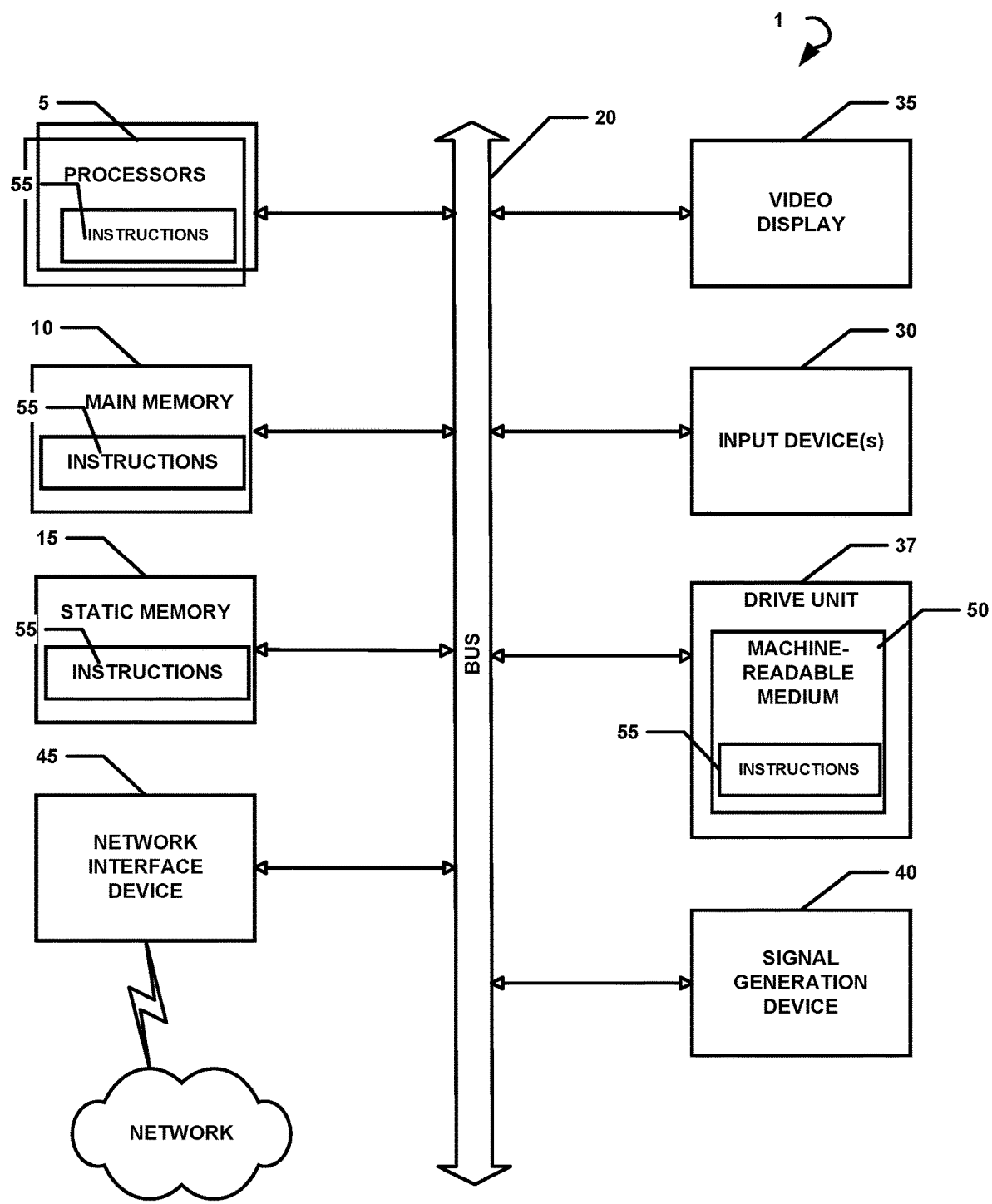
FIG. 10 illustrates an exemplary computing system that may be used to implement embodiments according to the present technology.

FIG. 10 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer-implemented system for adaptively scheduling a plurality of computer-based applications executed on a plurality of fog nodes communicably coupled via an Ethernet time sensitive network (TSN), said system comprising:
   a processor;
   a memory module communicably coupled to said processor, said memory module storing computer program code, wherein said memory module and said computer program code stored therein are configured, with said processor, to:
      communicably couple each of said plurality of fog nodes to at least one edge device respectively, and configure each of said plurality of fog nodes to process information received from corresponding edge devices as at least a part of a dataflow;
      calculate a global time schedule applicable for each of said plurality of fog nodes and said corresponding edge devices communicably coupled thereto, based on at least one of a cycle-by-cycle execution of said dataflow and a real-time execution of said dataflow across said plurality of fog nodes and said corresponding edge devices;
      provision at least a plurality of kernels and a plurality of real-time applications embedded within respective fog nodes to execute, at least in part, said data flow and process said information in line with said global time schedule applicable to said respective fog nodes;
      monitor each of said kernels processing said information, and in response to identifying at least one kernel as witnessing a time delay in processing said information, trigger said at least one kernel to determine a computing context corresponding to said processing of said information, and re-instantiate said processing of said information, based on said computing context, at a future time slot pre-determined by said global time schedule;

selectively identify a real-time application embedded within at least one of said plurality of fog nodes, and selectively configure said real-time application to process said information at a predetermined time slot forming a part of said global time schedule;

trigger said real-time application to dynamically identify based on said cycle-by-cycle execution of said dataflow, an offset occurred in respect of said processing of said information, wherein said offset is represented as a difference between said predetermined time slot and a time slot defined in said global time schedule based on said cycle-by-cycle execution of said dataflow, at which said real-time application was originally provisioned to process said information; and selectively calibrate said global time schedule based on said offset, and reschedule said real-time application to process said information always at said predetermined time slot, thereby deterministically scheduling said real-time application to process said information, based on said offset identified dynamically from said cycle-by-cycle execution of said dataflow.

2. The system as claimed in claim 1, wherein said computing context includes computing parameters necessary for processing said information, and wherein said computing parameters are selected from a group of resources consisting of CPU resources, storage resources, network resources, security resources, and I/O resources.

3. The system as claimed in claim 1, wherein said processor is further configured to determine a topography of said plurality of fog nodes and said corresponding edge devices communicably coupled thereto, only in an event said global time schedule is calculated based on said real-time execution of said dataflow across said plurality of fog nodes and said corresponding edge devices communicably coupled thereto, said processor further configured to calculate said global time schedule based on said topography.

4. The system as claimed in claim 1, wherein said processor is configured to synchronize each of said plurality of fog nodes and said corresponding edge devices communicably coupled thereto, by calculating and assigning said global time schedule thereto.

5. The system as claimed in claim 1, wherein said global time schedule includes a plurality of time slots assigned sequentially to each of said plurality of fog nodes and said corresponding edge devices for execution of said dataflow.

6. A computer-implemented method for adaptively scheduling a plurality of computer-based applications executed on a plurality of fog nodes communicably coupled via an Ethernet time sensitive network (TSN), said method comprising the following computer-implemented steps:

communicably coupling each of said plurality of fog nodes to at least one edge device respectively, and configuring each of said plurality of fog nodes to process information received from corresponding edge devices as at least a part of a dataflow;

calculating, by a processor, a global time schedule applicable for each of said plurality of fog nodes and said corresponding edge devices communicably coupled thereto, based on at least one of a cycle-by-cycle execution of said dataflow and a real-time execution of said dataflow across said plurality of fog nodes and said corresponding edge devices;

provisioning, by said processor, at least a plurality of kernels and a plurality of real-time applications embedded within respective fog nodes to execute, at least in part, said data flow and process said information in line with said global time schedule applicable to said respective fog nodes;

monitoring, by said processor, each of said kernels processing said information, and in response to identifying at least one kernel as witnessing a time delay in processing said information, triggering, by said processor, said at least one kernel to determine a computing context corresponding to said processing of said information;

re-instantiating, by said processor, said processing of said information, based on said computing context, at a future time slot pre-determined by said global time schedule;

selectively identifying, by said processor, a real-time application embedded within at least one of said plurality of fog nodes, and selectively configuring, by said processor, said real-time application to process said information at a predetermined time slot forming a part of said global time schedule;

triggering, by said processor, said real-time application to dynamically identify based on said cycle-by-cycle execution of said dataflow, an offset occurred in respect of said processing of said information, wherein said offset is represented as a difference between said predetermined time slot and a time slot defined in said global time schedule based on said cycle-by-cycle execution of said dataflow, at which said real-time application was originally provisioned to process said information;

selectively calibrating, by said processor, said global time schedule based on said offset, and thereby reschedule said real-time application to process said information always at said predetermined time slot; and deterministically scheduling, by said processor, said real-time application to process said information, based on said offset identified dynamically from said cycle-by-cycle execution of said dataflow.

7. The method as claimed in claim 6, wherein the step of triggering said at least one kernel to obtain a computing context, further includes the step of triggering said at least one kernel to determine computing parameters necessary for processing said information, and wherein said computing parameters are selected from a group of resources consisting of CPU resources, storage resources, network resources, security resources, and I/O resources.

8. The method as claimed in claim 6, wherein the method further includes the step of synchronizing, by said processor, each of said plurality of fog nodes and said corresponding edge devices communicably coupled thereto, by calculating and assigning said global time schedule thereto.

9. The method as claimed in claim 6, wherein the step of calculating a global time schedule, further includes the step of incorporating a plurality of time slots into said global time schedule, and assigning each of said time slots sequentially to each of said plurality of fog nodes and said corresponding edge devices for execution of said dataflow.

10. The method as claimed in claim 6, wherein the method further includes the step of determining, by said processor, said topography of said plurality of fog nodes and said corresponding edge devices communicably coupled thereto, only in an event said global time schedule is calculated based on said real-time execution of said dataflow across said plurality of fog nodes and said corresponding edge devices.

11. A non-transitory computer-readable storage medium having computer-readable instructions stored thereon, said computer readable instructions, when executed by a processor, cause said processor to:
communicably couple each of said plurality of fog nodes to at least one edge device respectively, and configure each of said plurality of fog nodes to process information received from corresponding edge devices as at least a part of a dataflow;
calculate a global time schedule applicable for each of said plurality of fog nodes and said corresponding edge devices communicably coupled thereto, based on at least one of a cycle-by-cycle execution of said dataflow and a real-time execution of said dataflow across said plurality of fog nodes and said corresponding edge devices;
provision at least a plurality of kernels and a plurality of real-time applications embedded within respective fog nodes to execute, at least in part, said data flow and process said information in line with said global time schedule applicable to said respective fog nodes;
monitor each of said kernels processing said information, and in response to identifying at least one kernel as witnessing a time delay in processing said information, trigger said at least one kernel to determine a computing context corresponding to said processing of said information, and re-instantiate said processing of said information, based on said computing context, at a future time slot pre-determined by said global time schedule;
selectively identify a real-time application embedded within at least one of said plurality of fog nodes, and selectively configure said real-time application to process said information at a predetermined time slot forming a part of said global time schedule;
trigger said real-time application to dynamically identify based on said cycle-by-cycle execution of said dataflow, an offset occurred in respect of said processing of said information, wherein said offset is represented as a difference between said predetermined time slot and a time slot defined in said global time schedule based on said cycle-by-cycle execution of said dataflow, at which said real-time application was originally provisioned to process said information; and
selectively calibrate said global time schedule based on said offset, and reschedule said real-time application to process said information always at said predetermined time slot, thereby deterministically schedule said real-time application to process said information, based on said offset identified dynamically from said cycle-by-cycle execution of said dataflow.

12. The computer-readable instructions as claimed in claim 11, wherein said computer-readable instructions, when executed by said processor, further cause said processor to:
determine said topography of said plurality of fog nodes and said corresponding edge devices communicably coupled thereto, only in an event said global time schedule is calculated based on said real-time execution of said dataflow across said plurality of fog nodes and said corresponding edge devices; and
synchronize each of said plurality of fog nodes and said corresponding edge devices communicably coupled thereto, by calculating and assigning said global time schedule thereto.

* * * * *